(12) United States Patent
Stefan et al.

(10) Patent No.: US 6,212,473 B1
(45) Date of Patent: Apr. 3, 2001

(54) VEHICLE NAVIGATION SYSTEM HAVING INFERRED USER PREFERENCES

(75) Inventors: Jeffrey Michael Stefan, Clawson; Dana Brian Fecher, Farmington Hills; Gregory Howard Williams, Brighton, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/399,508

(22) Filed: Sep. 20, 1999

(51) Int. Cl.[7] .................................................. G01C 21/34
(52) U.S. Cl. .......................... 701/210; 701/209; 340/990; 340/995
(58) Field of Search .................................... 701/200, 202, 701/207, 208, 209, 210; 73/178 R; 340/988, 990, 995

(56) References Cited

U.S. PATENT DOCUMENTS

| | | | |
|---|---|---|---|
| 5,612,882 | * | 3/1997 | Lefebvre ................................ 340/990 |
| 5,774,073 | * | 6/1998 | Maekawa et al. ..................... 340/995 |
| 5,797,113 | * | 8/1998 | Kambe et al. ......................... 701/210 |
| 5,878,368 | * | 3/1999 | Degraaf .................................. 701/209 |
| 5,919,246 | * | 7/1999 | Waizmann et al. ................... 701/210 |
| 5,961,571 | * | 10/1999 | Gorr et al. ............................. 340/990 |
| 5,991,689 | * | 11/1999 | Aito et al. .............................. 701/210 |
| 6,034,626 | * | 3/2000 | Maekawa et al. ..................... 701/210 |
| 6,125,323 | * | 9/2000 | Nimura et al. ........................ 701/210 |

* cited by examiner

Primary Examiner—Gary Chin
(74) Attorney, Agent, or Firm—Mark L. Mollon

(57) ABSTRACT

A vehicle navigation system for providing route guidance in response to an input destination. The navigation system comprises a position sensing unit for sensing the location of the vehicle, a user input device for entering preferred route criteria and the desired destination, a display for outputting route guidance information, a controller, and a machine learning unit. The machine learning unit communicates with the controller and the user input, and monitors the user-selected preferred route criteria during a learning phase. Once the preferred route criteria have been learned, the machine learning unit enters an intervention phase whereby inferred user-preferred route criteria is transmitted directly to the controller. In this manner, users need not enter preferred route criteria upon each navigation sequence.

20 Claims, 2 Drawing Sheets

VEHICLE NAVIGATION SYSTEM HAVING INFERRED USER PREFERENCES

BACKGROUND

1. Field of the Invention

The present invention relates to a vehicle navigation system having inferred user preferences.

2. Description of Background Information

Vehicle navigation systems are well-known. A typical vehicle navigation system searches for a route from the present position of the vehicle to the destination, and provides route guidance based upon the route found. Such systems reduce the burden on the driver when the vehicle is traveling on unfamiliar roads. To accomplish this, typical vehicle navigation systems include a function by which a route from the present position to the destination is retrieved in response to entry of the destination by the user, or other user inputs. A preferred route is then calculated and displayed to the driver. Typical vehicle navigation systems also include functions for detecting the present position of the vehicle and displaying the present position along with the desired route, thereby providing route guidance.

Conventional vehicle navigation systems allow the vehicle driver to choose among several route calculation criteria such that the navigation system can generate different routes to the desired destination point. For example, the vehicle driver can command the navigation system to determine the shortest distance between the present vehicle location and the destination address. Alternatively, the driver could command the navigation system to determine the shortest route traversal time between the present vehicle location and destination address. This may or may not correspond to the shortest distance route determination. In addition, user preferences could include route determinations such as the most freeway segments possible, or least use of freeways possible. Likewise, the navigation system may include a user preference for toll roads or avoidance of toll roads.

Regardless of the type of user preference inputs available, conventional navigation systems require a destination address entry as well as user preferred route calculation criteria each time the navigation system is activated. There are several drawbacks to requiring users to repeatedly input preferred route calculation criteria, obviously, it is cumbersome and less "user friendly" to require users to input preferred route calculation criteria upon every new navigation experience. Such inconvenience can lead to diminished navigation system use and decreased operator benefit.

SUMMARY OF THE INVENTION

Accordingly, it is an object of the invention to provide an improved vehicle navigation system. Another object of the present invention is to provide a vehicle navigation system having inferred user preferences.

According to the present invention, the foregoing and other objects and advantages are attained by a vehicle navigation system for providing route guidance in response to an input destination. The navigation system comprises a position sensing unit for sensing the location of the vehicle, a user input device for entering preferred route criteria and the desired destination, a display for outputting route guidance information, a controller, and a machine learning unit. The controller is arranged in communication with the position sensing unit, user input and display. The controller includes a route calculator for performing a route search from the sensed vehicle location to the desired destination in accordance with the preferred route criteria, and outputting route guidance information to the display. The machine learning unit communicates with the controller and the user input, and monitors the user-selected preferred route criteria during a learning phase. Once the preferred route criteria have been learned, the machine learning unit enters an intervention phase whereby inferred user-preferred route criteria is transmitted directly to the controller.

An advantage of the present invention is enhanced user friendliness as compared to conventional vehicle navigation systems. Other objects and advantages of the invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DESCRIPTION OF THE PREFERRED EMBODIMENTS

Figure 1:
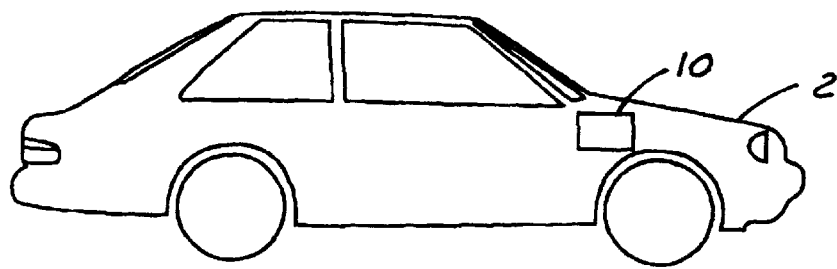
FIG. 1 is a schematic diagram of a vehicle equipped with a navigation system according to the present invention.
Figure 2:
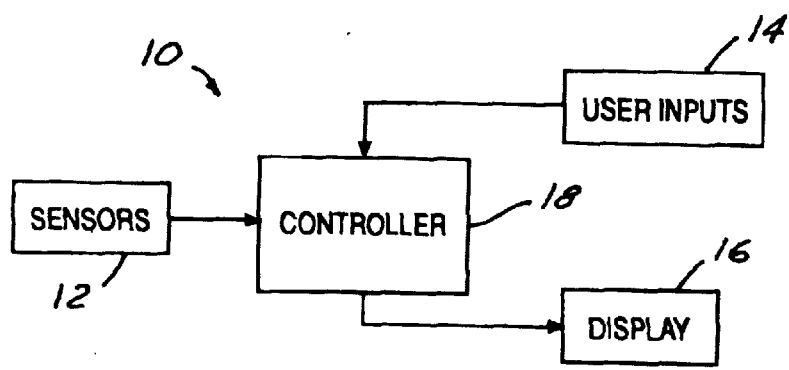
FIG. 2 is a block diagram of one embodiment of a vehicle navigation system according to the present invention.

An embodiment of the invention will now be described in detail herein with reference to the drawings. FIG. 1 shows a vehicle 2 with a navigation system 10 according to one embodiment of the present invention. The basic navigation system 10 is shown in greater detail in FIG. 2. The navigation system 10 includes sensors 12, a user input 14, output display 16, and a central controller 18.

Sensors 12 provide data to the controller 18 to determine the present vehicle location and its relation to a desired destination address. The sensors 12 are conventional and can include a global positioning system (GPS) which communicates with the existing GPS satellite network to provide highly accurate, real-time vehicle location data. The GPS satellite network includes a constellation of radio-navigation satellites which continuously transmit precise timing and location information to substantially the entire surface of the earth. Position sensors 12 located on the vehicle acquire transmissions from the corresponding plurality of GPS satellites. This allows the navigation system 10 to determine the location of the vehicle, velocity, and direction of motion. The GPS data in the sensor set 12 is augmented by dead-reckoning sensors. Dead-reckoning sensors include an absolute heading sensor such as a geomagnetic sensor or the like; a relative heading sensor such as a wheel sensor, steering sensor or a gyroscope; and a distance sensor for sensing traveling distance from the number of revolutions of a wheel. All of the positioning data gathered from the sensors 12 is supplied to the system controller 18.

User inputs 14 are similarly supplied to the system controller 18. User inputs 14 are supplied by way of an input apparatus comprising a keyboard or the like for generating various commands to the system controller 18. User inputs 14 can be supplied to the controller 18 using any known methods including keyboard entry, voice input, light pen, and touch screen. Using the input apparatus, the user supplies to the system controller 18 a desired destination address, and a preferred method of calculating the navigation route to the desired destination address. Many possibilities exist for preferred route calculations. These can include: a route which makes the least use of freeway segments; a route which makes the most use of freeways; the shortest route as measured by traversal time; the shortest route measured by distance; and a preference to avoid or use toll roads. Depending upon the communication capabilities of the navigation system 10, such user preferences could also include routes with the least amount of road construction, or the least amount of congestion. These latter two options would require data input from an area-wide traffic monitoring system such as are known in the art.

The display apparatus 16 comprises a display such as a CRT or color liquid-crystal display device or the like; graphic memory comprising VRAM or the like; a graphic controller for drawing map data sent from the system controller 18 as image data in the graphic memory and for outputting the image data; and a controller for displaying the map on the display 16 on the basis of the image data generated from the graphic controller. The display 16 outputs, as a color display, all screens necessary for navigation such as a route setting screen and screens of interval views of map data. The display 16 can also include the user inputs 14 for setting route guidance as well as inputs for changing over guidance and screens during the route instruction.

The display 16 and user inputs 14 are preferably provided as part of, or attached to, the instrument panel in the vicinity of the vehicle operator seat.

Figure 3:
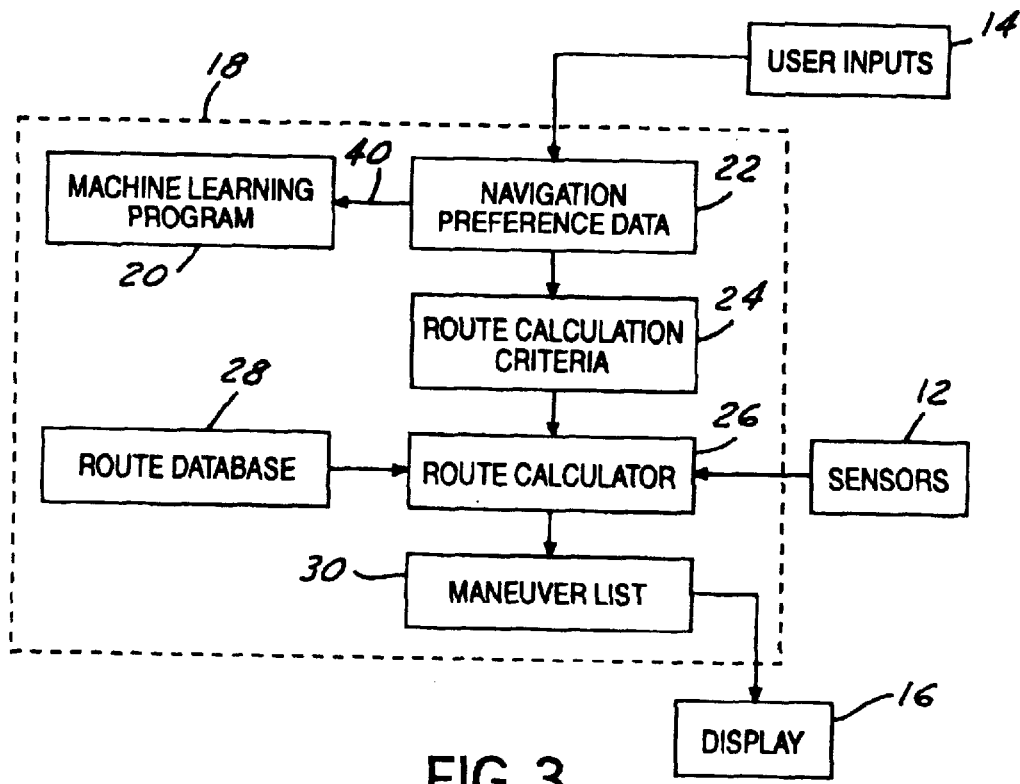
FIG. 3 is a more detailed block diagram of the navigation system of FIG. 2 during the learning phase of operation.

The controller 18 will now be described in greater detail with reference to FIGS. 3 and 4. Referring to FIG. 3, the navigation controller 18 comprises several regions designated in the block diagram as: machine learning program 20, navigation preference data 22, route calculation criteria 24, route calculator 26, route database 28, and maneuver list 30.

Machine learning program 20 comprises any known machine learning algorithms to process user inputs 14 to infer user preferences for the navigation system 10. Thus, for example, the machine learning program 20 could include a fuzzy logic system, a neural network, a genetic algorithm, or an expert system. The machine learning algorithms encompassed by machine learning program 20 fall into two categories: symbolic and connectionist. The symbolic methods used are statistical inferencing and ruled based inferencing. These symbolic methods generally depend on string inputs from the user. The connectionist methods employed are neural networks and fuzzy logic systems. Connectionist methods depend on numerical inputs. Thus, string inputs from the user must be transformed into numerical inputs before presenting information to the machine learning algorithms. The operation of the machine learning program 20 to infer user preferences for the navigation system 10 will be described in further detail below.

The navigation preference data 22 is derived from the user inputs 14 and presented to the machine learning program 20 as well as the route calculation criteria 24. Navigation preference data includes the user input preferences for the desired route calculation such as: least/most use of freeways, shortest time route, shortest distance route, and toll road avoidance/preference. Such navigation preference data 22 is then stored as route calculation criteria 24.

Route calculator 26 is the actual processor of the navigation controller 18. Accordingly, the route calculator 26 comprises an interface for receiving the detected outputs of the sensors 12. A central processing unit (CPU) for executing various image data processes and arithmetic operations, a read only memory (ROM), and random access memory (RAM). The route calculator 26 uses known methods to calculate a route to the desired destination address. Typically, the route calculator will use an algorithm incorporating a breadth-first search employing heuristics at each position node to help determine which position node to visit next. Navigation preference data 22 in the form of route calculation criteria 24 is added to the heuristics.

Route database 28 comprises map data stored as a CD-ROM or other non-volatile memory medium such as DAT, IC card, or the like.

The maneuver list 30 is the output of the route calculator 26. The maneuver list 30 comprises a sequence of maneuvers that the navigation system presents to the user by way of the display 16.

Figure 4:
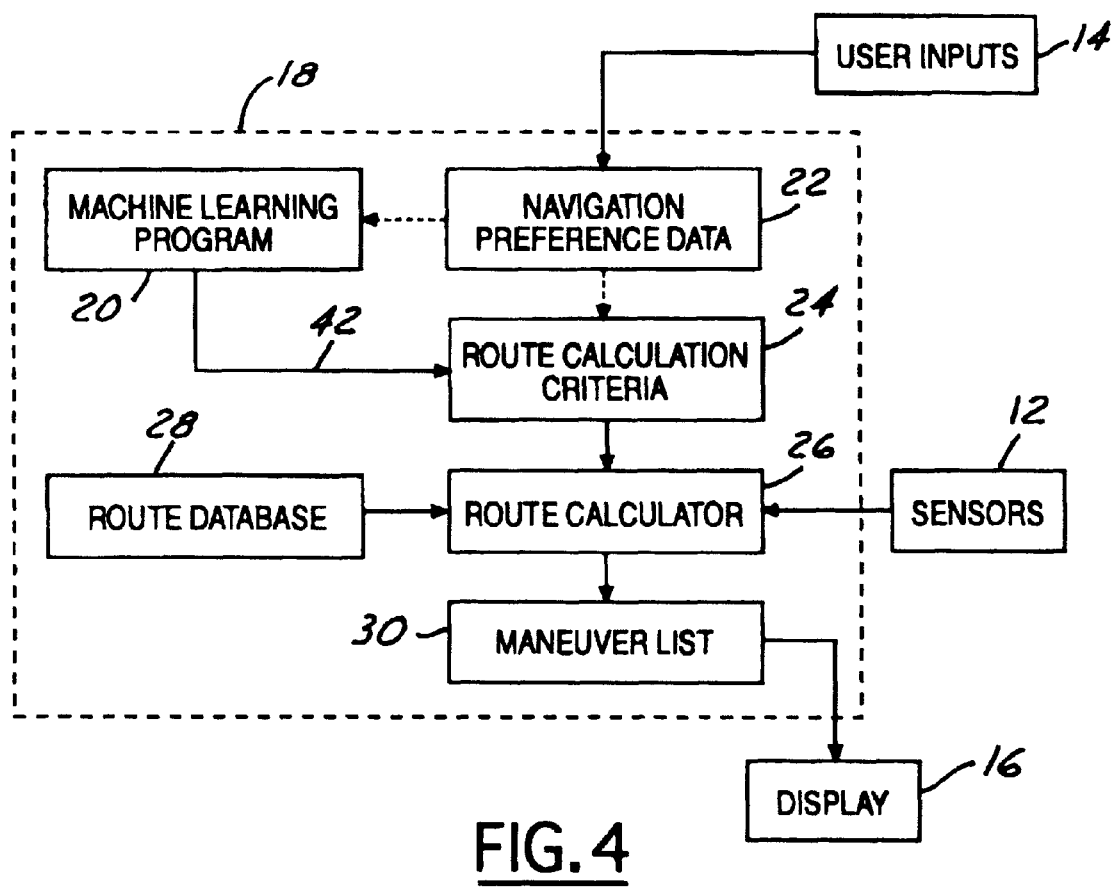
FIG. 4 is a more detailed block diagram of the navigation system according to FIG. 2 during the intervention phase of operation.

In operation, the navigation system 10 operates in a learning phase (FIG. 3) and an intervention phase (FIG. 4). During the learning phase, the machine learning program 20 collects and processes preference information entered by the user via signal line 40. Depending upon the machine learning algorithm employed, a pattern of user preference behavior is determined. Thus, for example, the machine learning program 20 may come to learn that a particular user always prefers that the navigation system present the shortest distance route to the desired destination address. When this pattern of preference behavior is determined, the machine learning program exits the learning phase and enters the intervention phase.

Referring to FIG. 4, during the intervention phase, the machine learning program 20 intervenes on behalf of the user. In other words, the machine learning program 20 presents the navigation preference data 22 inferred from the learning phase to the route calculation criteria 24 via signal line 42. This preference data is then passed along with the desired destination address to the route calculator 26. Thus, once in the intervention phase, there is no need for the user to provide route preference criteria. Rather, the user need only input a preferred destination address. Once in the intervention phase, however, the user can override the machine generated preferences by modifying the user inputs 14.

To allow the machine learning program 20 to distinguish among different users of the vehicle, user inputs preferably additionally include an input for a user identification such as a password or passcode. This user identification can be tied to the operator identification system of some vehicles which allows the vehicle to store in memory such things as radio pre-sets and seat positions for various users. Such identification can occur by inputting a user code into the navigation system, selecting a user "pre-set" button within the vehicle, entering a user-specific vehicle entry code or the like.

From the foregoing, it will be seen that there has been brought to the art a new and improved vehicle navigation system which overcomes the need for the user to repeatedly input route preference criteria such as is typical in conventional vehicle navigation systems. While the invention has been described ir connection with one or more embodiments, it will be understood that the invention is not limited to those embodiments. On the contrary, the invention covers all alternatives, modifications, and equivalents, as may be included within the spirit and scope of the appended claims.

What is claimed is:

1. A vehicle navigation system for providing route guidance in response to an input destination comprising:
   a position sensing unit for sensing the location of the vehicle;
   a user input device for entering preferred route criteria and said destination;
   a display for outputting route guidance information;
   a controller arranged in communication with said position sensing unit, user input and display, said controller including a route calculator for performing a route search from the sensed vehicle location to said destination in accordance with said preferred route criteria, and outputting route guidance information to said display; and
   a machine learning unit in operative communication with said controller and said user input, said machine learning unit monitoring said preferred route criteria input from said user input during a learning phase and transmitting inferred user-preferred route criteria to said controller during an intervention phase.

2. The vehicle navigation system of claim 1 wherein said machine learning unit is a symbolic-type machine learning unit.

3. The vehicle navigation system of claim 2 wherein said machine learning unit is an expert system.

4. The vehicle navigation system of claim 2 wherein said machine learning unit is a genetic algorithm.

5. The vehicle navigation system of claim 1 wherein said machine learning unit is a connectionist-type machine learning unit.

6. The vehicle navigation system of claim 5 wherein said machine learning unit is a neural network.

7. The vehicle navigation system of claim 5 wherein said machine learning unit is a fuzzy logic-based system.

8. The vehicle navigation system of claim 1 wherein said preferred route criteria includes at least one of the following criteria: the shortest distance route, the shortest time route, the route using the most freeways, the route using the least freeways, routes preferring toll roads, and routes avoiding toll roads.

9. The vehicle navigation system of claim 1 wherein said preferred route criteria includes routes with the least congestion.

10. The vehicle navigation system of claim 1 wherein said position sensing unit includes a global positioning system.

11. The vehicle navigation system of claim 1 wherein said user input includes a touch-screen.

12. The vehicle navigation system of claim 1 wherein said user input includes a voice input device.

13. A navigation system for automatically providing an automotive vehicle with route guidance in response to an input destination comprising:
   a position sensing unit for sensing the location of the vehicle;
   an information storage unit containing map and route information;
   a user input device for entering preferred route criteria and said destination;
   a display for outputting route guidance information;
   a controller arranged in communication with said position sensing unit, information storage unit, user input and display, said controller including a route calculator for performing a route search from the sensed vehicle location to said destination in accordance with said preferred route criteria and said information storage unit, and displaying route guidance information to said display; and
   a machine learning unit in operative communication with said controller and said user input, said machine learning unit monitoring said preferred route criteria input from said user input during a learning phase and transmitting inferred user-preferred route criteria to said controller during an intervention phase.

14. The navigation system of claim 13 wherein said information storage unit includes map data stored on CD-ROM.

15. The navigation system of claim 13 wherein said position sensing unit includes a global position system and at least one dead-reckoning sensor.

16. The navigation system of claim 13 wherein said machine learning unit is a symbolic-type machine learning unit.

17. The navigation system of claim 13 wherein said machine learning unit is a connectionist-type machine learning unit.

18. A method of inferring user preferences for a vehicle navigation system comprising a position sensing unit, a user input device, a display, a controller and a machine learning unit, the method comprising the steps of:
   monitoring, with said machine learning unit, preferred route criteria input from said user input and transmitted to said controller during a learning phase; and, thereafter,
   entering an intervention phase wherein inferred route criteria is transmitted to said controller in response to an input destination.

19. The method of claim 18 further comprising the step of identifying the user of said vehicle navigation system.

20. The method of claim 18 further comprising the steps of detecting a user-input route preference criteria and, if in the intervention phase, overriding the inferred route criteria and transmitting said user-input route preference criteria to said controller.

* * * * *